Sept. 27, 1932.   A. KADOW ET AL   1,879,690
GLASS CUTTING MECHANISM
Filed April 25, 1929   2 Sheets-Sheet 1
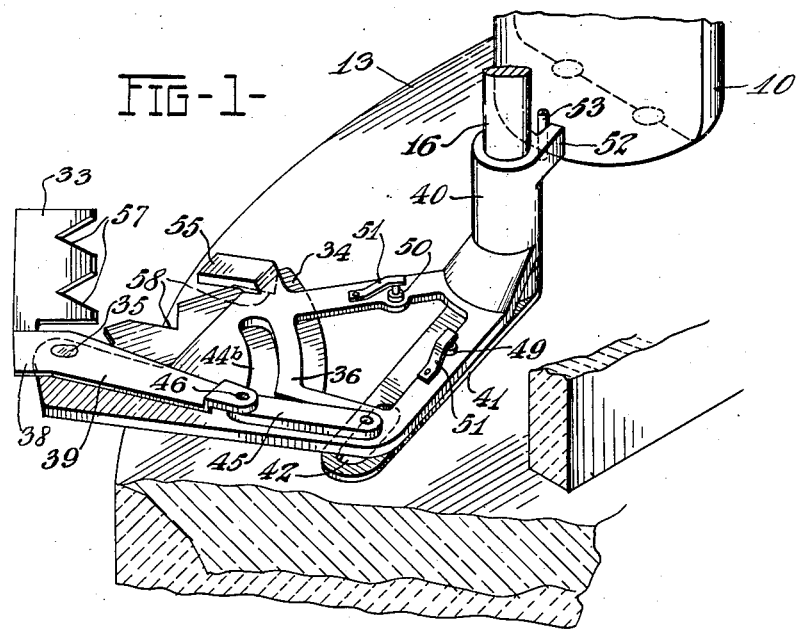
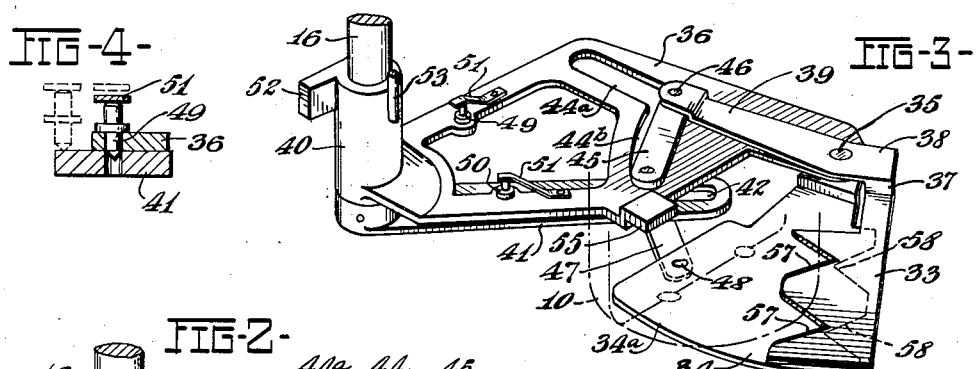
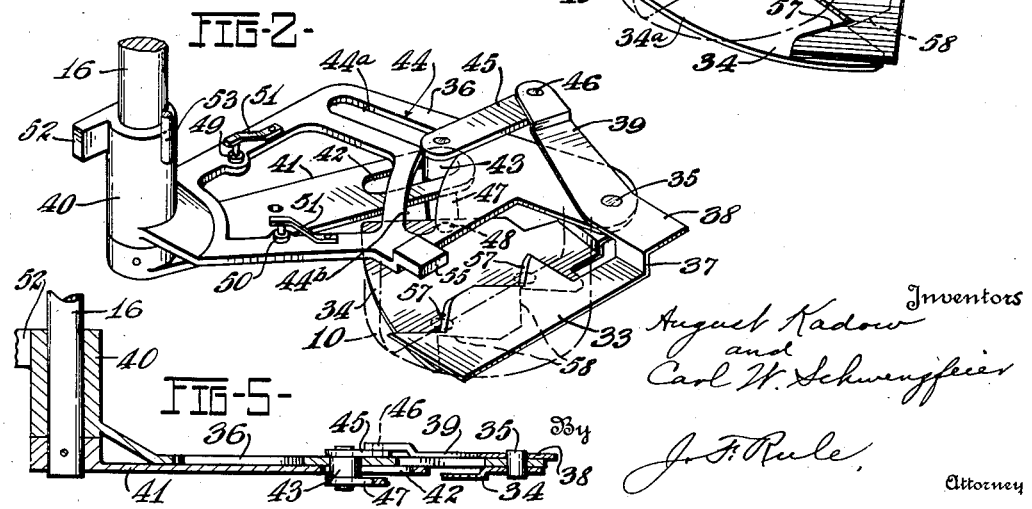

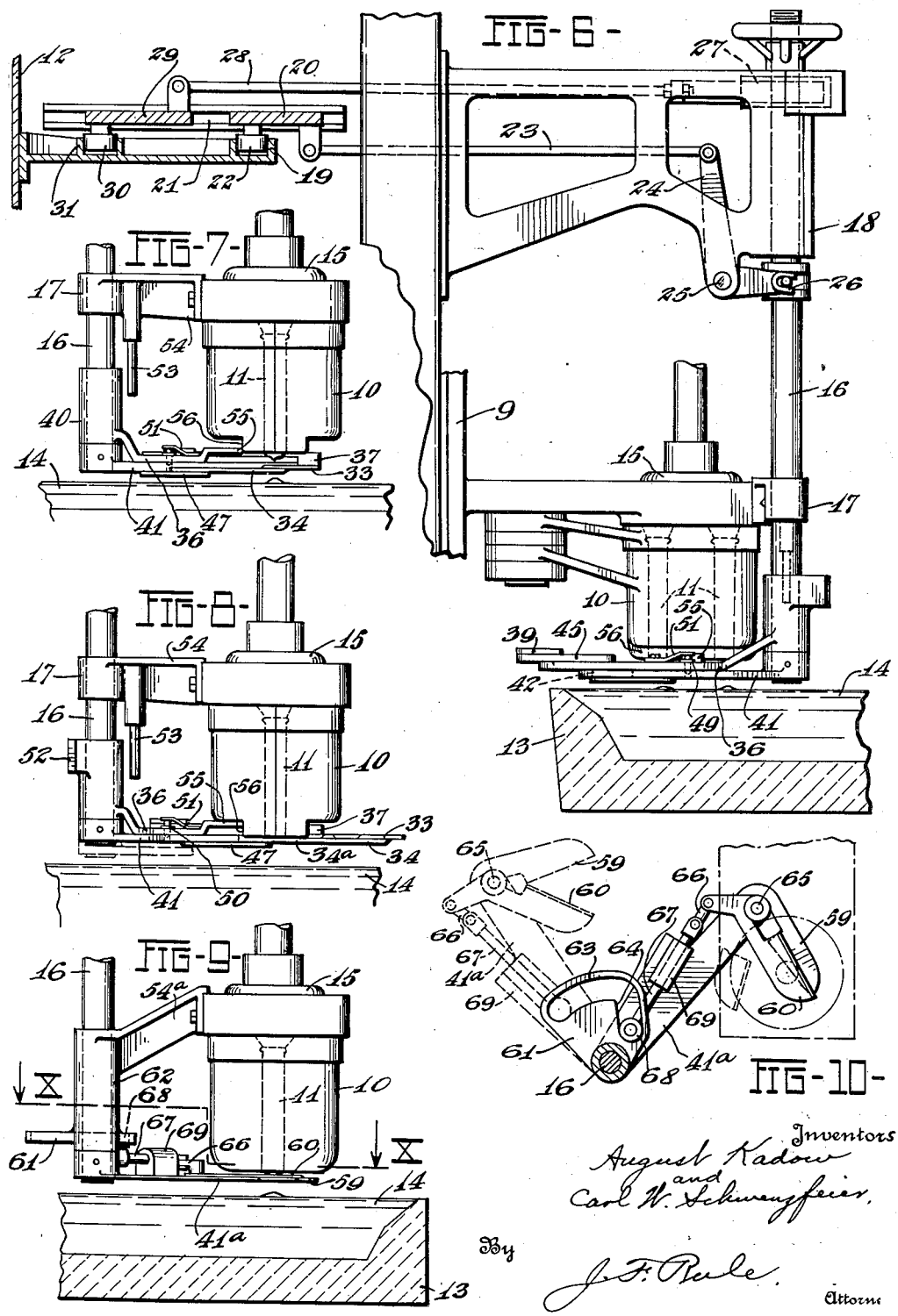

Patented Sept. 27, 1932

1,879,690

UNITED STATES PATENT OFFICE

AUGUST KADOW AND CARL W. SCHWENZFEIER, OF TOLEDO, OHIO, ASSIGNORS TO OWENS-ILLINOIS GLASS COMPANY, OF TOLEDO, OHIO, A CORPORATION OF OHIO

GLASS CUTTING MECHANISM

Application filed April 25, 1929. Serial No. 357,943.

Our invention relates to machines for molding glass articles and particularly to glass severing apparatus used with and forming a part of such machines. The invention is adapted for use in machines of the suction gathering type in which the blank molds are brought in succession to a charge receiving position over a tank or pool of molten glass, and draw charges of glass upward by suction into the blank mold cavities.

In machines of this type it is customary to sever the string of glass which extends from the mold cavity to the supply pool after the mold is lifted above the surface of the pool, by a knife blade which shears across the bottom of the mold. Such a construction is open to various objections. One of these relates to the cutoff scar which is ordinarily produced and appears as a defect in the finished ware. This scar is due in part to the excessive chilling of the glass at the periphery or margin of the mold opening. If this chilled portion is not reheated and reassimilated in the body of the blank a scar is produced which appears as a defect in the finished article.

Another objection to the usual knife construction relates to the excessive wear both of the knife and the mold owing to the knife striking the bottom of the mold at each cutting stroke. This necessitates frequent adjustments, sharpening of the knives, and grinding of the molds. This latter operation soon changes the shape and capacity of the mold to an objectionable extent.

An object of the present invention is to provide a practical form of cutting mechanism which will overcome the above objections. In its preferred form the invention comprises a pair of shear blades which operate to sever the glass without striking the mold, thus avoiding wear and mutilation of the molds, reducing or eliminating wear on the cutters and rendering unnecessary the usual frequent adjustments and reconditioning of the cutters and molds. The cutters also operate to sever the glass at a short distance below the mold and in a manner to prevent the formation of an objectionable cutoff scar.

Other objects of the invention will appear hereinafter.

In the accompanying drawings:

Fig. 1 is a perspective view showing the cutting mechanism and a portion of the gathering tank, the cutter blades being shown in their retracted open position.

Fig. 2 is a perspective view of the cutting mechanism showing the parts in an intermediate position during the cutting stroke and just at the instant the severing operation is completed.

Fig. 3 is a perspective view showing the relation of parts at the completion of the cutting stroke.

Fig. 4 is a detail showing a spring detent for locking the carrier plate to the operating arm.

Fig. 5 is a sectional elevation thru the cutting mechanism.

Fig. 6 is a part sectional elevation of a portion of the machine including a mold, the cutting mechanism, and the means for operating said mechanism.

Fig. 7 is a front elevation of the mold and cutting mechanism and shows the shears at the moment of severance.

Fig. 8 is a view similar to Fig. 7 but showing the relation of parts after the cutting stroke has been completed and the cutter plate lifted to mold closing position.

Fig. 9 is a view showing a modified form of cutting mechanism.

Fig. 10 is a section at the line X—X of Fig. 9.

The invention is herein shown as embodied in an Owens type of suction gathering machine such as shown, for example, in the patent to LaFrance, Number 1,185,687, June 6, 1916. The blank mold 10 comprises horizontally separable sections herein shown provided with a plurality of mold cavities 11. The blank mold is mounted as shown on a dip head or frame 9 supported on the mold carriage which rotates about the center column 12 to bring the molds in succession over a gathering pot or tank 13 in which is maintained a continuous supply of molten glass 14. When a mold is brought over the glass in the tank the dip frame 9 is lowered to contact the mold with the glass. Suction is then applied thru a head 15 to fill the mold cavity with glass. The mold is then lifted and the cutting mechanism operated as hereinafter explained to sever the glass at a short distance below the bottom of the mold.

The cutters are mounted on a vertical rock shaft 16 supported in bearings 17 and 18 on the dip frame. The shaft 16 is periodically moved up and down by means of a cam 19 formed on a stationary cam plate mounted on the central column 12. A slide block 20 is mounted to reciprocate radially of the mold carriage in guides 21, and is provided with a cam roll 22 running on the cam 19. A link 23 connects the slide block 20 with a bell crank 24 pivoted at 25 on the dip frame, said bell crank having a connection 26 with the shaft 16 for lifting and lowering the shaft. The shaft is rocked about its axis by means of the rack 27 and pinion, said rack being connected thru a link 28 to a slide block 29 having a roll 30 running in a cam 31 on the stationary cam plate.

The cutting mechanism includes a pair of shear blades comprising an upper blade 33 and a lower blade 34, both connected by a pivot pin 35 to a carrier plate 36. The shear blades are in planes parallel with and a short distance below the plane of the carrier plate 36. The blade 33 has a vertical offset 37 and an integral portion 38 above the plane of the blade, with the pivot 35 extending thru said portion 38, the latter being extended to form an operating arm 39. The carrier plate 36 is formed with an integral hub or bearing sleeve 40 mounted on the rock shaft 16. Beneath the carrier plate 36 and parallel therewith is an operating arm 41 keyed to the shaft 16. A slot 42 is formed in the outer end of the arm 41. Extending thru said slot is a cam roll or block 43 which also extends thru a cam slot 44 formed in the carrier plate 36. A link 45 has a pivotal connection 46 at one end with the arm 39 and at its opposite end is connected to the cam block 43. A link 47 is connected at one end by a pivot 48 to the lower cutter blade 34, and at its opposite end is pivoted to the cam roll 43 beneath the operating arm 41. The slot 44 comprises an operating section 44$^a$ which controls the opening and closing movements of the shear blades, and a section 44$^b$ which permits the shear blades to be rocked as a unit about the pivot 35 without relative movement of the blades, all as hereinafter more fully explained. The cam section 44$^b$ is curved in an arc concentric with the pivot 35.

The carrier plate 36 is adapted to have a limited rocking movement on the shaft 16 relative to the shaft and operating arm 41. At the limits of this relative movement said plate is connected to the operating arm by detents 49 and 50 actuated by springs 51. The carrier plate is adapted to oscillate about the axis of the shaft 16 thru a limited arc, the limit of its movement in one direction being determined by a stop lug 52 formed on the bearing sleeve 40, which lug engages a stop pin 53 depending from a bracket 54 forming part of the dip frame. The movement of the carrier plate in the opposite direction is limited by a stop 55 formed on said plate and adapted to engage a shoulder 56 formed on the mold 10.

The cutter blade 33 has its cutting edges in the form of V-shaped notches 57. The blade 34 has corresponding V-shaped notches 58 adapted to register with the notches 57. These cutting edges are so arranged that the apices of the notches will meet in the vertical center lines of the mold cavities as the severance of the glass is completed. In other words, the cutters are in vertical alignment or register with the mold cavities during the cutting operation.

The operation of the mechanism shown in Figs. 1 to 8 is as follows:

As the mold carriage rotates, the mold 10 is brought over the supply body of glass 14 in the tank 13. The carrier plate 36 at this time is in its outward position shown in Fig. 1 with the stop lug 52 against the pin 53. The carrier plate is locked to the operating arm 41 by the spring detent 49. The cutter blades supported on the carrier are in their open position. The mold now dips, gathers its charge by suction and is lifted a short distance from the supply body of glass in the usual manner. As soon as the mold is thus lifted, the stationary cam 31 (Fig. 6) operates thru the link 28 and rack bar 27 to rotate the rock shaft 16 and the operating arm 41. The carrier plate 36 being locked to said arm by the detent 49, swings as a unit therewith, the shear blades remaining in open position. As the shear blades reach a position beneath the mold, the stop 55 on the carrier plate strikes the shoulder 56 on the mold, thereby arresting the carrier plate. The operating arm 41, however, continues its movement, releasing itself from the spring detent 49 and carries the cam roll 43 along the cam slot sections 44$^a$ and 44$^b$. The movement along the section 44$^a$ operates thru the links 45 and 47 to swing the cutter blades 33 and 34 toward each other, thereby shearing the tails of glass extending from the mold to the supply body in the tank. The cutter blades come together, as before noted, with the cutting edges directly beneath and in line with the mold cavities. During this cutting stroke, the parts are brought to the Fig. 2 position, which shows the cutting edges of the blades directly beneath the mold cavities and the cam roll 43 at the inner end of the cam section 44$^a$. The continued movement of the operating arm 41 causes the roll 43 to travel along the cam section 44$^b$ which, as before noted, is concentric with the pivot 35. It will be apparent that owing to the shape of the cam section 44ᵇ there is no relative movement of the links 45, 47 and the blades to which they are attached, so that said blades will remain in their closed position and be swung as a unit about the axis of pivot 35 during the travel of the roll 43 along the slot 44ᵇ. In this manner, the cutting edges of the blade are swung from beneath the mold. The blade 34 has an integral extension 34ᵃ which at the completion of this swinging movement is directly beneath the mold cavities. The operating arm 41 as it completes its forward movement is locked to the carrier plate 36 by the detent 50.

As shown in Fig. 7, the cutter blades during the cutting stroke are a short distance below the bottom of the mold. When the operating arm 41 has completed its stroke as just described, the cam 19 (Fig. 6) operates to lift the rock shaft 16, thereby lifting the bottom closing plate 34ᵃ into engagement with the mold as shown in Fig. 8. While the bottoms of the mold cavities are thus closed the parisons may be compacted in the mold as usual by air pressure momentarily supplied thru the upper end of the mold.

The rock shaft 16 is now lowered and then rocked to swing the carrier plates 36 and shear blades outward away from the mold. During this swinging movement the shear blades remain closed and in the position relative to the carrier plate shown in Fig. 3, the operating arm 41 being locked to said plate by the detent 50. When, during this outward movement, the stop lug 52 strikes the pin 53, the carrier plate 36 is arrested, so that the operating arm 41 during the final position of its outward swing, moves the cam roll 43 along the slot 44, first swinging the blades inwardly and then opening them to the Fig. 1 position, these movements being the reverse of those which take place during the operating stroke.

Figs. 9 and 10 illustrate a modification in which shear blades 59 and 60 are provided. The blade 59 is shown integral with an operating arm 41ᵃ keyed to the rock shaft 16. A cam plate 61 is formed on a bearing sleeve 62 in which the shaft 16 is mounted, said sleeve being integral with a bracket 54ᵃ fixed to or forming part of the dip frame. The cam plate is provided with a cam slot comprising a section 63 concentric with the shaft 16 and a section 64 at an angle to the section 63. The shear blade 60 is connected by a pivot 65 to the arm 41ᵃ and has an operating connection thru a link 66 and rod 67 to a cam roll 68 running in the cam slot. The rod 67 is slidable lengthwise in a bearing 69 formed on the arm 41ᵃ.

The operation of the shear mechanism just described is as follows:

While the mold is gathering its charge the shears are open and in a retracted position, as shown by dotted lines in Fig. 10. As the mold with its charge of glass is lifted from the pool the shaft 16 is rocked and the operating arm 41ᵃ thereby swung toward the mold. During this swinging movement the shears remain open while the cam roll 68 moves along the cam section 63. The cam roll then moves inwardly along the section 64 and operates thru the rod 67 and link 66 to rapidly swing the shear blade 60 to its closed position. The shears are thus operated to sever the glass as they are brought beneath the mold. When the shaft 16 is rocked in the reverse direction, the shears are returned to the dotted line position (Fig. 10).

Modifications may be resorted to within the spirit and scope of our invention.

What we claim is:

1. Apparatus for forming glass articles comprising, in combination, a mold, means for moving the mold over a supply body of molten glass for receiving a charge of glass by suction, a pair of shears laterally disposed at one side of the mold, and means to actuate said shears and swing them to a position beneath the mold and then cause the cutting edges thereof to meet directly beneath and in line with the mold cavity for severing the glass.

2. The combination of a suction gathering mold open at its lower end to receive a charge of glass by suction, a pair of shears, means to swing said shears into and out of a position beneath the mold, and means to impart a severing operation to the shears while beneath the mold.

3. The combination of a suction gathering mold open at its lower end to receive a charge of glass by suction, a carrier, shear blades thereon, means for swinging said carrier and bringing the blades beneath the mold, and means for operating said blades while beneath the mold for shearing the glass.

4. The combination of a mold open at one end to receive a charge of glass, a carrier plate, shears thereon, means to move said plate back and forth and thereby moving the shears into and out of an operative position in juxtaposition to the mold cavity, means operable positively to hold said shears immovable relative to each other while being moved into and out of said operative position, means to close said shears when brought to said operative position, and means to open the shears when they have been moved by the carrier to a position away from the mold.

5. The combination of a mold, a rock shaft, a carrier, shear blades on the carrier, means providing an operating connection between said rock shaft and carrier, means to rock said shaft and thereby move the carrier and shear blades into and out of an operative position in which the blades are in juxtaposition to the mold, and means for automatically imparting a cutting stroke to the shear blades when brought to said position.

6. The combination of a mold, a rock shaft, a carrier, shear blades on the carrier, means providing an operating connection between said rock shaft and carrier, means to rock said shaft and thereby moving the carrier and shear blades into and out of an operative position in which the blades are in juxtaposition to the mold, and a cam operable to impart a cutting stroke to the shear blades when in said position.

7. The combination of a mold, a rock shaft, a carrier, shear blades on the carrier, means providing an operating connection between said rock shaft and carrier, means to rock said shaft and thereby moving the carrier and shear blades into and out of an operative position in which the blades are in juxtaposition to the mold, a cam, and operating connections between the cam and the shear blades, said cam shaped to hold the shear blades open during their approach to the mold and to impart a cutting stroke to the shear blades when brought to said operative position.

8. The combination of a pair of cooperating shear blades, a support on which said blades are pivotally mounted, a cam, a slide block, links connecting said slide block to the respective shear blades, and means for moving said slide block along the cam for actuating the shear blades, said cam comprising a section arranged in an arc concentric with the pivot of the shear blades, whereby the blades are swung as a unit about said pivot while the slide block moves along said section, the cam including a second section arranged at an angle to said first mentioned section, said second section operable to control the opening and closing movements of the shear blades.

9. The combination of a vertically disposed rock shaft, a horizontally disposed carrier plate mounted on the rock shaft, a pair of shear blades pivotally mounted on the carrier plate, means to rock said shaft and thereby carry the shear blades without relative movement of the blades toward and from an operating position, and means controlled by the movement of the rock shaft to impart a shearing movement to the blades after they have been brought to said operating position.

10. The combination of a vertically disposed rock shaft, a horizontally disposed carrier plate mounted on the rock shaft, a pair of shear blades pivotally mounted on the carrier plate, means to rock said shaft and thereby move the shear blades toward and from an operating position, and means controlled by the movement of the rock shaft to actuate the shear blades.

11. The combination of a vertically disposed rock shaft, a horizontally disposed carrier plate mounted to swing about the axis of said shaft, a pair of shear blades pivoted on the carrier plate, means for rocking said shaft, means for releasably connecting the carrier plate to the shaft to rock therewith during a portion of its rocking movement, and means actuated by the rock shaft to impart a cutting stroke to the shear blades during another portion of the rocking movement of said shaft.

12. The combination of a vertically disposed rock shaft, a horizontally disposed carrier plate mounted to swing about the axis of said shaft, a pair of shear blades pivoted on the carrier plate, means for rocking said shaft, means for releasably connecting the carrier plate to the shaft to rock therewith during a portion of its rocking movement, means actuated by the rock shaft to impart a cutting stroke to the shear blades during another portion of the rocking movement of said shaft, said last mentioned means comprising a cam on said carrier plate, operating connections between said cam and the cutter blades, and an operating arm secured to the rock shaft and arranged to operate said connections.

13. The combination of a rock shaft, a carrier plate pivotally mounted thereon, an operating arm secured to the rock shaft, a pair of shear blades pivoted on the carrier plate, a cam block, links extending from the cam block to the respective shear blades, a cam formed on the carrier plate, means providing an operating connection between said cam block and operating arm, means for rocking said shaft, means for yieldably connecting the operating arm to the carrier plate for causing the latter to move with the rock shaft during a portion of the movement of said shaft, and means for arresting the carrier plate, whereby during the continued movement of the rock shaft and operating arm said cam block is actuated under the control of the cam to impart a cutting movement to the shear blades.

14. The combination of a supporting plate, a pair of shear blades pivoted thereon to swing about a common axis, a cam, a cam block, links connecting said cam block to the respective shear blades, said cam comprising a section arranged in an arc concentric with said pivot, and a section at an angle to said first mentioned section, and means for moving the cam block along the cam.

15. The combination of a mold carriage, a mold thereon, a rock shaft, a carrier plate pivotally mounted on the rock shaft, an operating arm fixed to the rock shaft, means to rock said shaft, a pair of shear blades pivoted to the carrier plate, a detent releasably connecting the carrier plate to the operating arm, means to rock said shaft and thereby swing the carrier plate with the open shear blades to a position beneath the mold, a stop to arrest the carrier plate, a cam on the carrier plate, operating connections between said operating arm and the shear blades for operating the latter under the control of said cam and imparting a cutting stroke to said shear blades after the carrier plate is arrested, and a second detent operable to connect the operating arm to the carrier plate at the completion of the cutting stroke, whereby when the rock shaft is rotated in the reverse direction, the carrier plate is withdrawn from beneath the mold before the shear blades are separated.

16. The combination of a mold open at its lower end to receve a charge of glass, a pair of shear blades, means to operate said shear blades to sever the glass beneath the mold opening, one of said blades being extended to form a mold closing plate, and means for moving said plate upward after the cutting stroke into position to close said mold opening.

17. The combination of a mold open at its lower end to receive a charge of glass, a pair of shear blades, means to operate said shear blades to sever the glass beneath the mold opening, a mold closing plate brought into position beneath and spaced from the mold after the glass is severed, and means actuated by the shear blade operating means for causing said plate to close the lower end of the mold.

18. The combination of a mold having a bottom opening thru which glass is introduced, a pair of shear blades, a cam, an operating device cooperating with said cam to actuate the shear blades, said cam comprising a section shaped to impart a cutting stroke to the shear blades, and a section shaped to swing the shear blades as a unit after the cutting stroke to carry the cutting edges to one side of the mold opening, a mold closure plate carried with one of the shear blades and brought to a position directly beneath the mold opening by said swing of the shear blades, and means for moving said plate upward into position to close the mold opening.

Signed at Toledo, Ohio, this 24th day of April, 1929.

AUGUST KADOW.
CARL W. SCHWENZFEIER.